(12) United States Patent
Daniel et al.

(10) Patent No.: US 10,534,523 B1
(45) Date of Patent: Jan. 14, 2020

(54) INDEPENDENT CONTROL OF MAP DATA DISPLAY

(71) Applicant: AMAZON TECHNOLOGIES, INC., Seattle, WA (US)

(72) Inventors: Bruce Daniel, Seattle, WA (US); James Peter Biagioni, Seattle, WA (US); Matthew James Dorfmann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 15/366,802

(22) Filed: Dec. 1, 2016

(51) Int. Cl.
*G06F 3/0484* (2013.01)

(52) U.S. Cl.
CPC ........... *G06F 3/04845* (2013.01); *G06F 2203/04806* (2013.01)

(58) Field of Classification Search
CPC .................................................. G06F 3/0484
See application file for complete search history.

(56) References Cited

U.S. PATENT DOCUMENTS

2009/0182500 A1* 7/2009 Dicke .................. G01C 21/00
701/532
2014/0280180 A1* 9/2014 Edecker ............ G06F 17/30867
707/740

* cited by examiner

*Primary Examiner* — Andrea C Leggett
(74) *Attorney, Agent, or Firm* — Patterson + Sheridan, LLP

(57) ABSTRACT

A machine and associated methods are provided to decouple the level of detail shown within a map from the zoom level of the map. A user interface is provided to receive commands to increase or decrease the level of detail of items shown in a map, including the number of geographical elements shown in the map, independent of a control of a change in the zoom level for the map. Rendering circuitry can responsively render different versions of a map having different levels of detail within the same zoom level. The different versions of the map can be displayed on a display device.

20 Claims, 8 Drawing Sheets

700

702 Receive a stylesheet including a first display schema for the first zoom level defining the first plurality of data items and a second display schema for a second zoom level defining the second plurality of data items.

704 Render the second graphical image of the map at the first zoom level by using the second display schema for the second zoom level in the stylesheet while maintaining the visible area of the map at the first zoom level.

FIG. 7

INDEPENDENT CONTROL OF MAP DATA DISPLAY

BACKGROUND

Digital maps provide graphical images representing a geographical area and geographical elements, points of interest, and data within the geographical area (e.g., cities, roads, bodies of water, street names, etc.). Typically, a level of detail of the items shown within the map and/or how the items are displayed within the map are predetermined and explicitly tied to a scale or a zoom level of the displayed map. For example, as a user zooms into a map, generally more information appears (e.g., additional city or town names, additional street or road names, etc.). Thus, if a user desires to view additional details that might not be shown in a graphical representation of a digital map, a user must zoom into the map in order to view the additional details. Similarly, as a user zooms out of a map, generally less information appears (e.g., less city or town names, less street or road names, etc.). Thus, if a user desires to view less detail than is currently shown in a graphical representation of the digital map, the user must zoom out of the map to reduce the detail shown in the map. Although these approaches may be suitable in some instances, such approaches do not necessarily meet the needs of all users or application settings.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIG. 7 is another example flow diagram of logic illustrating an example method of changing a level of detail displayed in a map, according to certain embodiments.

DETAILED DESCRIPTION

Figure 1:
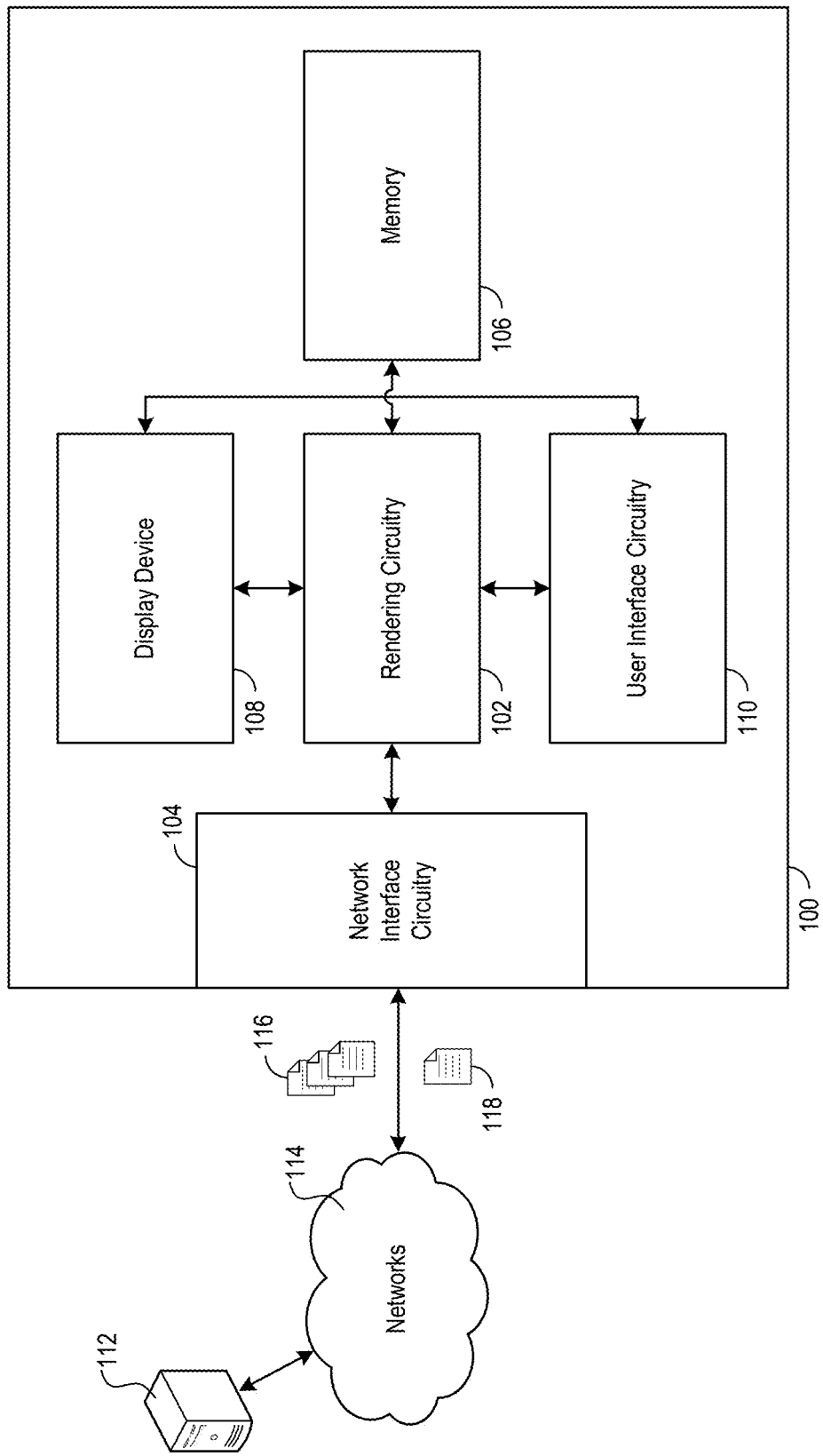
FIG. 1 is a schematic view of a portion of an example machine, according to various embodiments.

In example embodiments described herein, a computing device provides control of an amount of data displayed on a map independent from a change in a level of zoom of the display of the map. The computing device enables a user to change the level of detail of the items shown within the map and/or the specifics of how those items are displayed within the map without requiring the user to zoom into or zoom out of the map. For example, a user may be enabled to alter the display of the map to include additional detail without the need to zoom into the map. Similarly, a user may be enabled to alter the display of the map to include less detail without the need to zoom out of the map.

In certain approaches, the computing device receives a stylesheet for a map. The stylesheet provides multiple display schemas for at least one, some, or each separate zoom level. For example, a stylesheet may include a basic display schema and a detailed display schema (or more display schemas) for a single zoom level. Each display schema dictates which items will be displayed within the map and the style with which they are displayed. Thus, by providing multiple display schemas with varying levels of detail for a single zoom level, a computing device can dynamically switch between the different levels of detail within a single zoom level according to the different display schemas.

In various approaches, the computing device provides a user interface to allow the user to dynamically alter the level of detail shown in the map within any particular zoom level. For example, the user interface may provide or enable receipt of instructions, commands, and/or gestures from a user to dynamically alter the level of detail shown in the map independent from a change in the zoom level of the displayed map. For example, the user interface may provide dedicated instructions, commands, and/or gestures for altering the level of detail of the map that are different from instructions, commands, and/or gestures for changing the zoom level of the map.

The embodiments disclosed herein provide technical solutions to a technical problem existing within the context of displaying and dynamically altering the display of digital data. The functionality and usability of applications that display digital data, such as digital maps, is greatly improved by enabling dynamic alteration of the display of the digital data to suit the diverse immediate or ongoing needs of a variety of users. This reduces the need to provide different data display applications (e.g., different digital map applications) that are individually suited to the needs of particular subsets of users but not all users. Thus, a single data display application can be provided to consolidate or reduce the overall number of applications running or stored on a machine. Further, many of the embodiments disclosed herein reduce an amount of data transferred over a network and the number of data requests transferred over the network caused by a user interfacing with a digital map device or application. For example, the embodiments may reduce or eliminate a need to zoom into or zoom out of a map to alter the amount of data shown. Zoom operations typically initiate a request from a computing device for new map tiles appropriate to the newly specified geographical area. However, by providing additional detail with the map tiles and enabling a user to dynamically alter the display of that detail will reduce the need for the user to zoom in and zoom back out to request and receive entirely new map tiles, thereby reducing network requests and data transfer traffic. Additionally, by pre-loading the data for a particular map tile at an electronic device, the device can quickly provide the increased detail without the need to request new map tiles from a zoom in process.

Alternatively, map tiles may be provided with less detail when a requested level of detail for a given zoom level is reduced. For example, if a user controls a map interface to provide less detail than a default level of detail, map tiles with less detail may be provided to the user device, thereby reducing network traffic and enabling the device to quickly receive complete map tiles that are not burdened with excessive detail data that is not required for a lower level of detail for a particular zoom level.

Although many of the embodiments are described herein within the particular context of digital maps, the concepts and embodiments are extendable to and applicable to other contexts involving the display of digital data and are not limited to digital maps. For example, graphical depictions of charts, tables, graphs, or other images may be alterable to provide varying levels of detail or data granularity according to the control of a level of detail (or another factor) independent from a change in a current zoom level (or a change in another factor). For example, the level of detail of a graph (e.g., the detail at which granular change is shown within the graph) may be altered independent of a level of zoom for that graph.

Further, the concepts and embodiments can be extended to altering the display of digital data along trajectories other than the level of detail or the zoom level. For example, within a digital map setting, the concepts can be extended to altering the display of temperature zones, precipitation, minerals, population numbers, fish species, migration patterns, political affiliations, or any other data that might be suitable for display on a digital map or in a different format such as a chart, table, graph, image, or other graphical format.

Referring now to the figures, FIG. 1 schematically illustrates a portion of an example machine 100 (e.g., an electronic device or a computing device) configured in accordance with various embodiments for altering a level of detail displayed in a map. In various embodiments, the machine 100 includes rendering circuitry 102, network interface circuitry 104, a memory device 106, a display device 108, and user interface circuitry 110. The machine 100 may also include one or more processing devices 802 (see FIG. 8) that, together with instructions stored within the memory device 106 or instructions received via the network interface circuitry 104, implement portions of the various circuitry elements (e.g., the rendering circuitry 102, the network interface circuitry 104, and the user interface circuitry 110). The rendering circuitry 102 may be communicatively coupled to the network interface circuitry 104, the memory device 106, the display device 108, and the user interface circuitry 110 to receive and send data and instructions to and from the various components. The display device 108 may also be communicatively coupled to the user interface circuitry 110 to provide visual aspects of a user interface.

The network interface circuitry 104 communicates with external devices such as a server 112, via a network 114 such as the Internet. The user interface circuitry 110 may include various input components and output components to enable a user to interface with the machine 100 to control a display of a map. The display device 108 may be integrated with the machine 100 or may be otherwise connected to the machine 100. The display device 108 may include many different kinds of displays, including a liquid crystal display (LCD), a light emitting diode (LED) display, an electrowetting display (EWD), or another suitable or common display type. The display device 108 provides rendered images of a map in accordance with various embodiments.

The rendering circuitry 102 may render images of a digital map by seamlessly joining one or more individual geographical map tiles and rendering one or more graphical images corresponding to data items within the geographical map tiles included in the displayed geographical area. The geographical map tiles may be vector tiles, which are packets of geographical data ("geodata") packaged into pre-defined square shaped tiles. The geographical map tiles each include multiple data items that correspond to multiple different geographical elements within a geographical area defined by the geographical map tiles. For example, the data items within a map tile may include natural aspects of the geographical area such as bodies of water, land areas, land type (e.g., prairie, beach, and/or forest), or elevations. The data items may also include man-made structures or infrastructure such as highways, arterial streets, local roadways, country or state roadways, railways, bridges, airports, buildings, and so forth. The data items may also include textual and categorical items applicable to individual points within map tile, structures or areas within the map tile, or the entire map tile area. Textual and categorical items may include labels, titles, places of business, points of interest, borders, boundaries, land designations, national parks, cities, neighborhoods, counties, countries, street names, and the like. Each type of data item discussed above (e.g., each type of natural aspect, man-made structures, or textual and categorical items) may represent a different data category or data type within the geographical map tile. For example, a different data category or data type may exist for the bodies of water or the land areas within the map tile, the national parks or municipal parks within the map tile, the highways, streets, or buildings within the map tile, the borders, points of interest, or cities within the map tile, and the associated labels within the map tile. According to various embodiments, varying levels of detail can be presented with regard to these different data categories individually or combined together within a view of the map.

Geographical map tiles in the vector tile format may include representations of the data items as vector data describing the physical shape or location of the various geographical elements corresponding to the data items within the map tile. The vector data may include points, line strings, and polygons. The vector tile format may also include the map data (e.g., labels or other data) that correspond to the physical geographical elements within the map tile or to the map tile as a whole. Other map tile types, such as raster tiles, may be utilized in other embodiments. In still other embodiments, hybrid map tiles may be utilized that include aspects of both vector tiles and raster tiles. For example, a vector tile may include a raster image layer that includes a graphical image associated with the map tile (e.g., a satellite view or rasterized images of graphical elements such as roads or borders).

The data for the individual geographical map tiles 116 may be stored on a server 112 and may be received by the machine 100 via a network 114 such as the Internet using, for example, hypertext transfer protocol (HTTP). Alternatively, map tiles may exist on a computer readable medium, such as memory 106 or another computer readable medium that can be coupled to (e.g., directly coupled to) and read by the machine 100 (e.g., a flash drive, an SD card, a micro SD card, a compact flash card, a compact disc, etc.). Different map tiles may exist for different zoom levels for a given geographical area. Map tiles may parse a given geographical area into separate map tiles according to the current zoom level of the displayed map. In various approaches, the map tiles are indexed in a hierarchical binning arrangement (e.g., a quadtree arrangement). For example, at a lowest zoom level (e.g., zoom level 1), the entire world may be shown and split into four map tiles. However, at the next zoom level (e.g., zoom level 2), each of those four zoom level 1 tiles is further separated into four more additional map tiles. With each zoom level, the map tiles may be recursively split into more tiles (e.g., by splitting each map tile into four more map tiles at the next zoom level). Alternatively, a given map tile may span multiple zoom levels (e.g., a given map tile may be used to display a map at zoom levels 5-7). At the lowest zoom level, each map tile may only include high-level geographical data for each map tile such as shapes, borders, and names for continents, oceans, and large countries. Additional detail data may be added to each map tile as the zoom level increases. For example, a map tile for a zoom level of 5 may also include country level and state-level data (e.g., shapes, borders, and names for individual U.S. states and larger bodies of water and major highways and interstates), while a map tile for a zoom level 12 may also include city-level data (e.g., shapes, borders, and names for cities, medium sized bodies of water, and arterial roads). A zoom level 20 may be the highest zoom level and may represent data at an individual street-level, which may include much more granular data than the lower zoom levels, such as building shapes and individual addresses. Many variations of map tile data are possible and the amount of data and the type of data stored within each map tile at various zoom levels can be varied as is appropriate in different application settings.

A zoom operation, such a zoom in or zoom out operation, involves changing the displayed scale of an image of a map on the display device 108. For example, as a user zooms in on a map, the machine 100 enlarges the scale at which a portion of the map is displayed. For example, prior to a zoom in operation, a map may be displayed with a scale such that a mile is represented by 100 pixels on the display device 108. However, after zooming in, the map may be displayed with a scale such that a mile is represented by 200 pixels on the display device 108. In other words, a portion of the image of the map is enlarged on the display device 108. Similarly, as a user zooms out from a map, the machine 100 decreases the scale at which the map is displayed. For example, after zooming out, the map may be displayed with a scale such that a mile is represented by 50 pixels on the display device 108. After zooming out, a larger geographical area will be displayed on the display device 108. The machine 100 may need to request and receive additional map tiles for the portions of the larger geographical area that were not shown on the display device 108 prior to the zoom out procedure.

In digital mapping applications, a zoom operation may be initiated by shifting through various zoom levels for the particular map (e.g., between zoom levels 1-20). The machine 100 may request and retrieve different map tiles to display in a manner dictated by the stylesheet as a result of the zoom procedure.

The rendering circuitry 102 may request individual map tiles 116 or sets of map tiles 116 based on the geographical area of a map being displayed on the display device 108. For example, the rendering circuitry 102 may request all map tiles 116 for a geographical area defined by a current view of the map on the display device 108. The rendering circuitry 102 may request, via the network interface circuitry 104, particular map tiles by name or identification, or may communicate the borders of a view of the map and request all map tiles therein. The network interface circuitry 104 may subsequently receive the map tiles 116 via the network 114 and may provide the received map tiles 116 to the rendering circuitry 102 or directly to the memory device 106. The rendering circuitry 102 may also store the received map tiles 116 in the memory device 106. Alternatively, the map tiles may be stored or otherwise provided to the machine 100 on a computer readable medium that is coupled to the machine 100 (e.g., an SD card or flash drive).

The rendering circuitry may also receive a stylesheet 118 for the map. The stylesheet 118 may be located in a dedicated stylesheet file that is received by the network interface circuitry 104 over the network 114 from a server 112. Alternatively, the style sheet may be stored or otherwise provided to the machine 100 on a computer readable medium that is coupled to the machine 100 (e.g., an SD card or flash drive). The stylesheet 118 is a data structure that describes and dictates the content of a map (e.g., what data items should be displayed in the map) and the style in which the content should be displayed (e.g., color, size, font, etc.), also called a display schema. Other names for the stylesheet 118 include styling documentation or styling specification. The stylesheet 118 may include one display schema for each zoom level or multiple display schemas for each zoom level. In some implementations, a display schema may be applicable to multiple zoom levels (e.g., zoom levels 5-7 may share a same style schema). All of the display schemas within a stylesheet, including multiple stylesheets for various individual zoom levels, may be created or edited by a cartographer or designer to suit the particular needs of a given application setting in which the map will be utilized. In various embodiments, the style sheet may be a JavaScript Object Notation (JSON) data structure, though other data structure types may be suitable in various application settings.

In operation, and in accordance with various embodiments, the rendering circuitry 102 receives the stylesheet 118 and the particular geographical map tiles 116 associated with the geographical area to be displayed. The rendering circuitry 102 then pieces the geographical map tiles 116 together and renders a map image according to the style dictated by the particular display schema for the particular zoom level. The rendering circuitry 102 utilizes the vector data within the geographical map tiles to draw lines, points, polygons, colors, shapes, icons, and other graphical elements in the style dictated by the display schema for the data elements specifically listed within the display schema. For example, the display schema at a particular zoom level may dictate that highways are to be displayed five pixels wide and in yellow with a gray border and are to include their label using a 6 point font in black, while local streets are to be displayed two pixels wide in light gray and without names. The rendering circuitry 102 will follow the specific display settings outlined in the particular display schema to render the map image. The rendered map image is displayed on the display device 108.

A user can interface with the map through the user interface circuitry 110. For example, a user may change the location of the displayed map and/or may zoom in or zoom out of the displayed map using the user interface circuitry 110. For example, if the user interface circuitry 110 includes a touchscreen interface, a user may initiate changes in the displayed map by touching and dragging the map to change the geographical area displayed, or using a two-finger pinch or two-finger expansion to zoom in and zoom out. Such interactions with the map via the user interface circuitry 110 may cause the rendering circuitry 102 to re-render all or a portion of the map image to render new map image data according to the same display schema or a different display schema.

In various embodiments, the stylesheet 118 may include multiple display schemas for individual zoom levels. Put another way, all or some individual zoom levels within the stylesheet 118 may include more than one display schema. As discussed herein, these multiple display schemas may be defined using a decimal or dash representation that references the zoom level and the particular display schema identification for that zoom level. For example, if zoom level 12 has five different display schemas, the individual display schemas may be referred to as display schema 12.1, 12.2, and so forth, or 12-1, 12-2, and so forth. Each different display schema may provide a different view of the map. In certain examples, each increasing display schema provides for an increasing number of data items to be displayed and/or labelled within a rendered image of a map. Similarly, each increasing display schema may provide for an increasing number of data items of a particular data category or data type (e.g., city, roadways, and bodies of water, etc.) to be displayed and/or labelled within a rendered image of a map. For example, display schema 12.1 may only show large city names, interstate highways, and names for bodies of water over 40,000 acres. However, display schema 12.3 may also show small city names, arterial streets with names, and names for bodies of water over 10,000 acres. Further, each increasing display schema may dictate a different style with which the various data items are shown, which styles may change with each different display schema.

Table 1, provided below, illustrates an example of certain aspects of a style sheet in accordance with various embodiments.

level, importance, popularity, etc.). Generally, as one moves down the list of sub-categories, the physical size (or other aspect) of the geographical element becomes smaller.

The table is populated with colors and numbers that represent, in this example, the color of the graphical representation (e.g., polygon or line) of any geographical element within the data category. For the parks and water bodies data categories, the number represents a font size for a label associated with the geographical element. For the hydrology data category, the number represents a line width. Many entries in the table are blank, which means that the geographical item is neither displayed nor labelled. Some entries in the table only include a color but no font size, which indicates that the geographical element will be graphically represented in that level of detail view, but will not be labelled.

In each of these example zoom levels, it is shown that the number of data elements shown within a single zoom level increases as the level of detail increases (as the display schema number increases, e.g., from 12.1 to 12.2). For example, as the display schema changes from 12.1 and 12.2,

TABLE 1

|  | 11.1 | 11.2 | 11.3 | 12.1 | 12.2 | 12.3 | 13.1 | 13.2 | 13.3 |
|---|---|---|---|---|---|---|---|---|---|
| PARKS (polygon) | | | | | | | | | |
| park area-min 1000000 sq unit | green/12 | green/11.5 | green/11 | green/14 | green/13 | green/12.5 | green/14 | green/13 | green/12.5 |
| park area-min 500000 sq unit | — | green/10.5 | green/10 | green/12 | green/11.5 | green/11 | green/14 | green/13 | green/12.5 |
| park area-min 250000 sq unit | — | — | green/9 | — | green/10.5 | green/10 | green/12 | green/11.5 | green/11 |
| park area-min 100000 sq unit | — | — | — | — | — | green/9 | — | green/10.5 | green/10 |
| park area-min 50000 sq unit | — | — | — | — | — | — | — | — | green/9 |
| WATER BODIES (polygon) | | | | | | | | | |
| water area-min 200000 sq unit | blue/11 | blue/10 | blue/10 | blue/12 | blue/11 | blue/11 | blue/12 | blue/11 | blue/11 |
| water area-min 100000 sq unit | — | blue/9 | blue/9 | blue/11 | blue/10 | blue/10 | blue/12 | blue/11 | blue/11 |
| water area-min 50000 sq unit | — | — | blue/ | — | 9 | 9 | 11 | 10 | 10 |
| water area-min 20000 sq unit | — | — | — | — | — | blue/ | — | 9 | 9 |
| water area-min 10000 sq unit | — | — | — | — | — | — | — | — | blue/ |
| HYDROLOGY (line) | | | | | | | | | |
| river/canal | blue/2 | blue/2 | blue/2 | blue/3 | blue/3 | blue/3 | blue/4 | blue/4 | blue/4 |
| stream | — | — | blue/1 | — | blue/1.5 | blue/1.5 | blue/2 | blue/2 | blue/2 |
| ditch/intermittent | — | — | — | — | — | — | — | — | blue/1 (dash) |

As is illustrated in the example style sheet of Table 1, three different zoom levels are provided (11, 12, and 13). Each zoom level is provided with multiple different display schemas (e.g., 11.1, 11.2, and 11.3). In this example, the display schema increases in detail as the second number increases. Although the display schemas are labelled as shown (e.g., 11.2, 12.3, 13.2, etc.), other labelling methods may be utilized such as, for example, 12.12, 12.13, 12.14, 13.13, 13.14, and so forth. In the table, three different data categories or data types of data items are shown (parks, water bodies, and hydrology). Each large data category is shown split into multiple different sub-categories depending on size (e.g., park area minimum 500000 sq, water area minimum 20000 sq, river/canal, stream, and ditch, and so forth) or depending on other factors (such as category, traffic new graphical representations of different sub-categories of data items within a particular data category are added to the displayed map. That is, in display schema 12.2, parks (within the parks data category) having areas of 250000 sq, water bodies (within the water bodies data category) having areas of 50000 sq, and streams (within the hydrology data category) are shown, while they are not shown in display schema 12.1. Further, display styles may change between display schemas for a same common data item within a particular sub-category. For example, in display schema 12.1, parks with an area of 500000 may be labelled with a 12 pt. font, while in display schema 12.2, those same parks are labeled with an 11.5 pt. font. The decreasing font size may accommodate the additional data (graphical representations and labels) that are presented within the map. Further, graphical representations and/or labels may be provided with different opacity levels according to different display schemas.

In various embodiments, the machine 100 may transition between these different display schemas without altering the zoom level of the displayed map. For example, a user may be able to interface with the map via the user interface circuitry 110 to provide a command to increase or decrease the level of detail provided on the map independent of changing the current zoom level (e.g., while staying in the same current zoom level). In response to receiving the command to change the level of detail, the rendering circuitry 102 may reference a different display schema for the zoom level and will render the map image to include the data items called for in that display schema and in the style indicated in that display schema. For example, if a user provided a command to increase the level of detail by two steps (e.g., from display schema 12.1 to display schema 12.3), the rendering circuitry 102 would render new map imagery to include any additional data items that are called for in the new display schema that were not present in the previous display schema, and would display those data items (as well as any other data item) in the particular style indicated by the new display schema without changing the zoom level.

Figure 2:
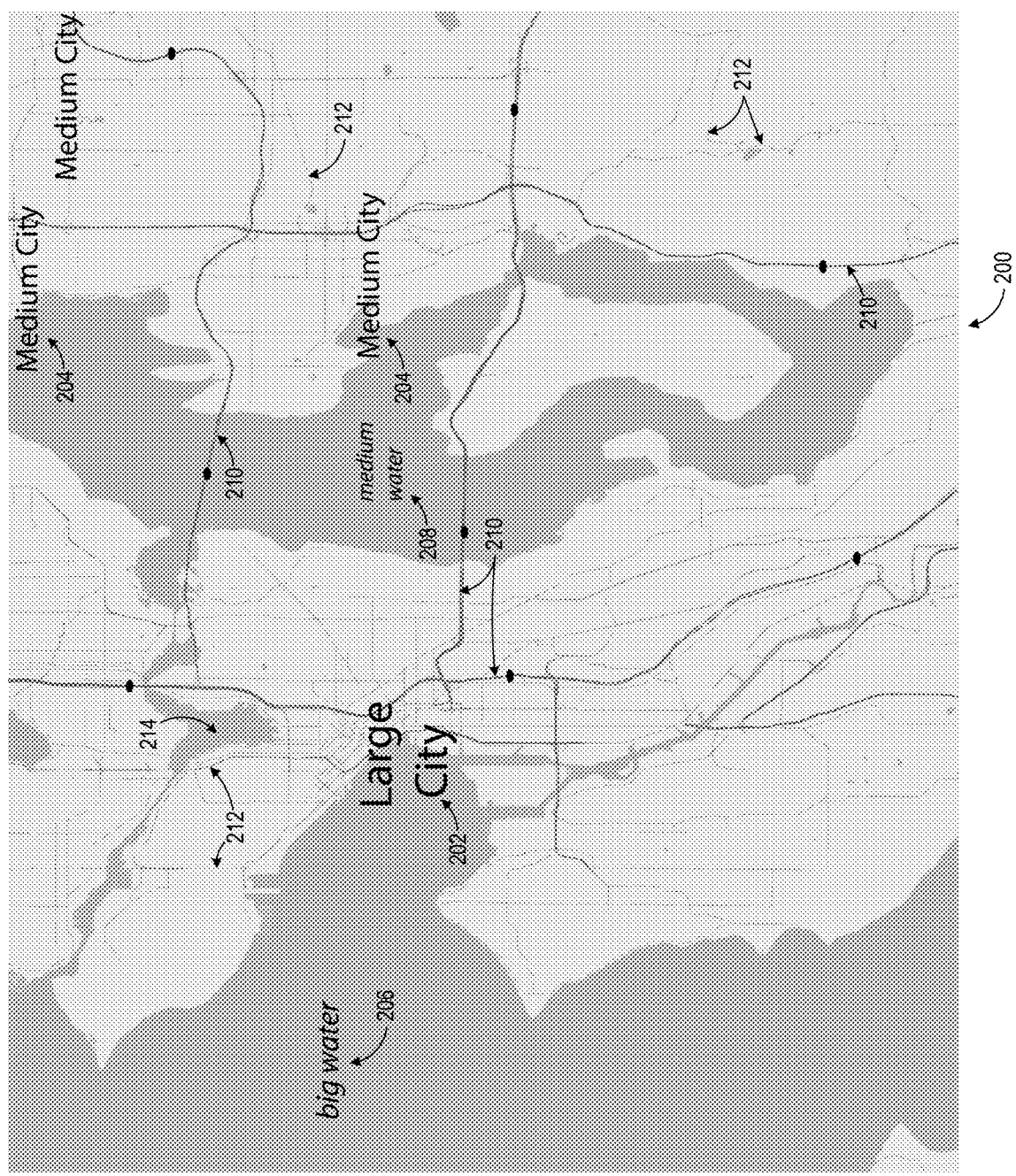
FIG. 2 is an example map image rendered in accordance with a basic display schema, according to various embodiments.
Figure 3:
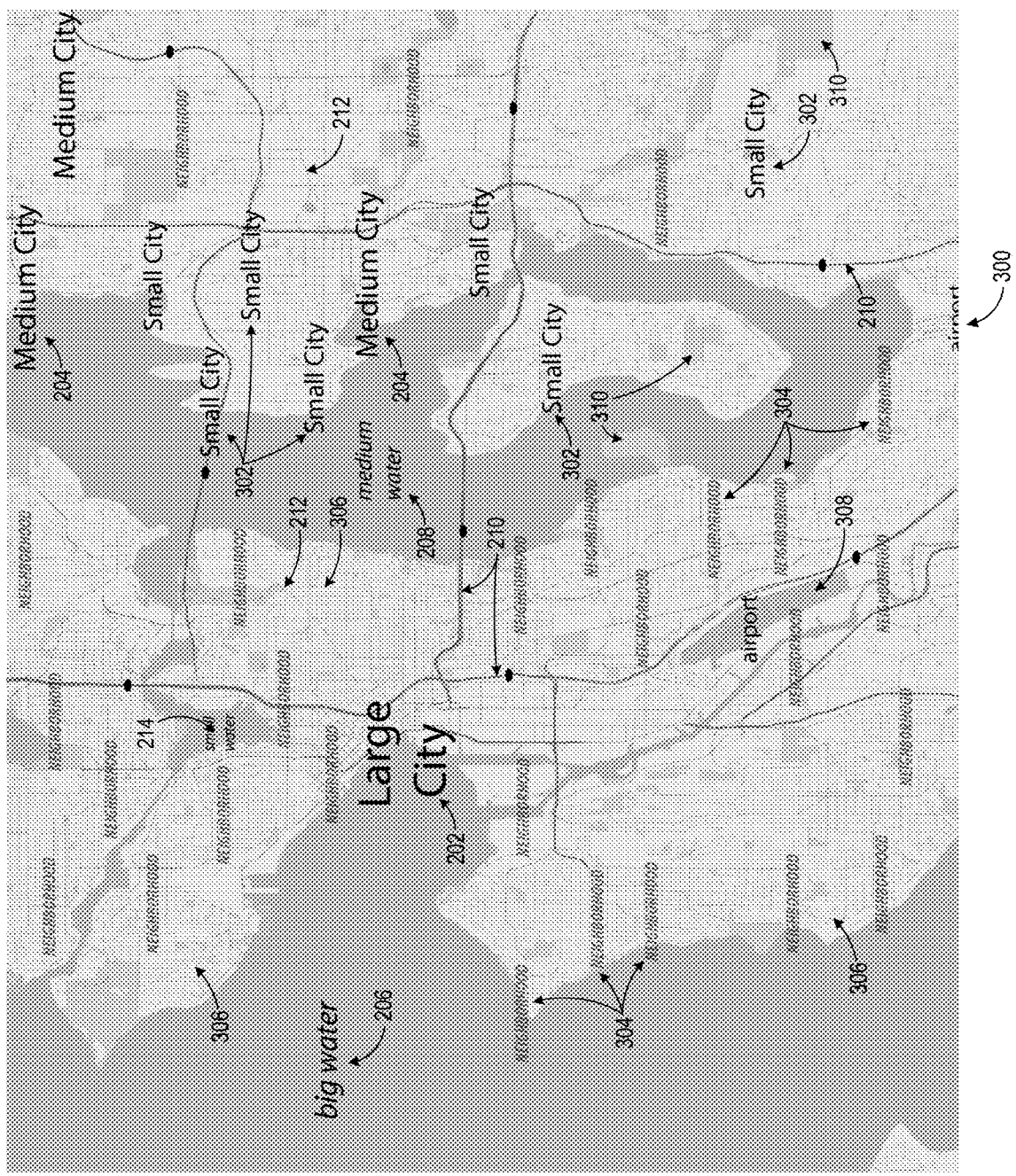
FIG. 3 is another example map image rendered in accordance with a detailed display schema, according to various embodiments.

In one example, a stylesheet may include a basic display schema and a detailed display schema for a single zoom level, though other display schemas for the zoom level may exist as well. FIGS. 2 and 3 illustrate example map images rendered in accordance with a basic display schema (FIG. 2) and rendered in accordance with a detailed display schema (FIG. 3). As is shown in FIG. 2, the low detail map 200 illustrates a geographical area being rendered with a low level of detail. For example, only large city names 202, medium city names 204, large bodies of water 206, medium bodies of water 208, major interstates 210, and arterial streets 212 are shown or labelled. However, geographical elements such as smaller bodies of water 214 may be shown but not labelled.

The rendering circuitry 102 rendered the image of the low detail map 200 according to the basic display schema of the stylesheet 118 for the particular zoom level to include only those data elements that are specifically called out within the basic display schema. The rendering circuitry 102 will render the enumerated data items using the vector data for the particular data items within the map tiles for the shown geographical area. The rendering circuitry 102 will render the enumerated data items in the style indicated in the basic display schema. For example, large cities 202 are shown in a large font, while medium cities are shown in a medium font. Interstates 210 are shown with thicker darker lines, while arterial streets 212 are shown with thinner and lighter lines. The names of the bodies of water 206 and 208 are italicized. The bodies of water are shown with a particular color (e.g., blue), while the land is shown with a different color. These stylistic aspects are also dictated by the particular display schema from the stylesheet.

If a user were to provide a command to the computing device to increase the level of detail for the map without changing the zoom level, the rendering circuitry 102 may render a new or updated image of a high detail map 300 according to the detailed display schema for the same zoom level, as is shown in FIG. 3. The high detail map 300 may include the same elements as the low detail map 200 (e.g., large cites 202, medium cities 204, large bodies of water 206, etc.), but may also include additional graphical representations of other data items and additional labels within the map tiles. For example, the high detail map 300 may also include small cities 302, neighborhoods 304, local roads 306, and labels for small bodies of water 214. Further, the high detail map 300 may also include points of interest such as airports 308 and parks 310.

The rendering circuitry 102 rendered the image of the high detail map 300 according to the detailed display schema to include the data elements specifically called out within the detailed display schema, which are greater in number and density than the data elements called out in the basic display schema for the low detail map 200. The rendering circuitry 102 renders graphical representations of the data items according to the style dictated by the detailed display schema from the stylesheet. Thus, as is illustrated in the example rendered images of the low detail map 200 of FIG. 2 and the high detail map 300 of FIG. 3, the computing device can generate different views of the map having different levels of detail without requiring a user to change the zoom level for the map.

In another approach, instead of utilizing multiple display schemas for a particular zoom level, in response to a command to increase (or decrease) the level of detail in the map, the rendering circuitry 102 may instead maintain a current zoom level but may utilize the display schema for a different zoom level. Thus, for example, if a map is presently displayed at zoom level 12, and a user provides a command to increase the level of detail by two steps, the rendering circuitry 102 may render a new image of the map by presenting the map in the same zoom level 12 (e.g., by not zooming in or zooming out), but by utilizing the display schema for zoom level 14 in the stylesheet to dictate the increased detail of the contents and style of what is displayed in the map. Thus, the rendering circuitry 102 provides the new image of the map in the same zoom level. In this approach, the machine 100 may need to request and receive new geographical map tiles corresponding to the increased zoom level either upon receipt of the command to increase the level of detail of when initially requesting and receiving the map tiles to account for future increased detail requests from a user.

In various approaches, it may be useful to limit the change in level of detail provided for a map. For example, the machine 100 may provide one to four additional levels of increased detail above the normal default level of detail. This may limit the amount of data that is retrieved from the network, as well as limit the display from becoming so detailed as to become illegible or indiscernible.

In various approaches, a default level of detail may be set by the designers of the map. The stylesheet may include a default display schema as one of the multiple display schemas provided for a zoom level within the stylesheet. For example, designers may set display schema 12.3 as a default display schema, e.g., in stylesheet having five display schemas for zoom level 12. This allows two levels of increase (up to display schema 12.5) and two levels of decrease (down to display schema 12.1) in the level of detail shown in the map. The rendering circuitry 102 may be configured to render the first image of the map (e.g., upon initialization of when first displaying a particular area of the map) using the default display schema. Alternatively, the rendering circuitry 102 may remember the most recently used display schema level (e.g., 12.5, representing a +2 display schema level above the default display schema of 12.3) and may render the first map image (e.g., upon initialization or startup) using the same display schema level (e.g., +2) within the same zoom level or a different zoom level. Alternatively still, a user may be able to set a preferred default display schema that the rendering circuitry will use when rending the first image of the map at startup. The user interface circuitry 110 may provide the user with the ability to make a selection of a preferred default display schema.

In another alternative, the rendering circuitry 102 may determine a most commonly used display schema level used by a single user. For example, if a user most commonly views maps using a X.2 display schema (e.g., representing a −1 display schema level, having a decreased level of detail), the rendering circuitry 102 may use that display schema as the default display schema for that user. In a slightly different approach, the rendering circuitry 102, or the server 112, may determine a most commonly used display schema level for a plurality of users (e.g., users within a particular region, users of a certain demographic, or all users of the map application), which the rendering circuitry 102 may use as the default display schema level. The rendering circuitry 102, or the server 112, may make the determination of the most commonly used display schema level for the user or for a group of users universally for all geographical areas viewable on the map and at all zoom levels. Alternatively, the determination of the most commonly used display schema levels may be made based on a particular geographical area shown in the map and based on particular zoom levels. For example, in rural areas, the most commonly used display schema level may be one with more detail (e.g., 12.4), whereas in urban areas, the most commonly used display schema level may be one with less detail (e.g., 12.2). Also, for example, at zoom level 12, a 12.2 display schema may be the most commonly used display schema, however, at zoom level 14, display schema 12.4 may be the most commonly used display schema. A combination of the above default display schema approaches may be utilized, as well.

Figure 4:
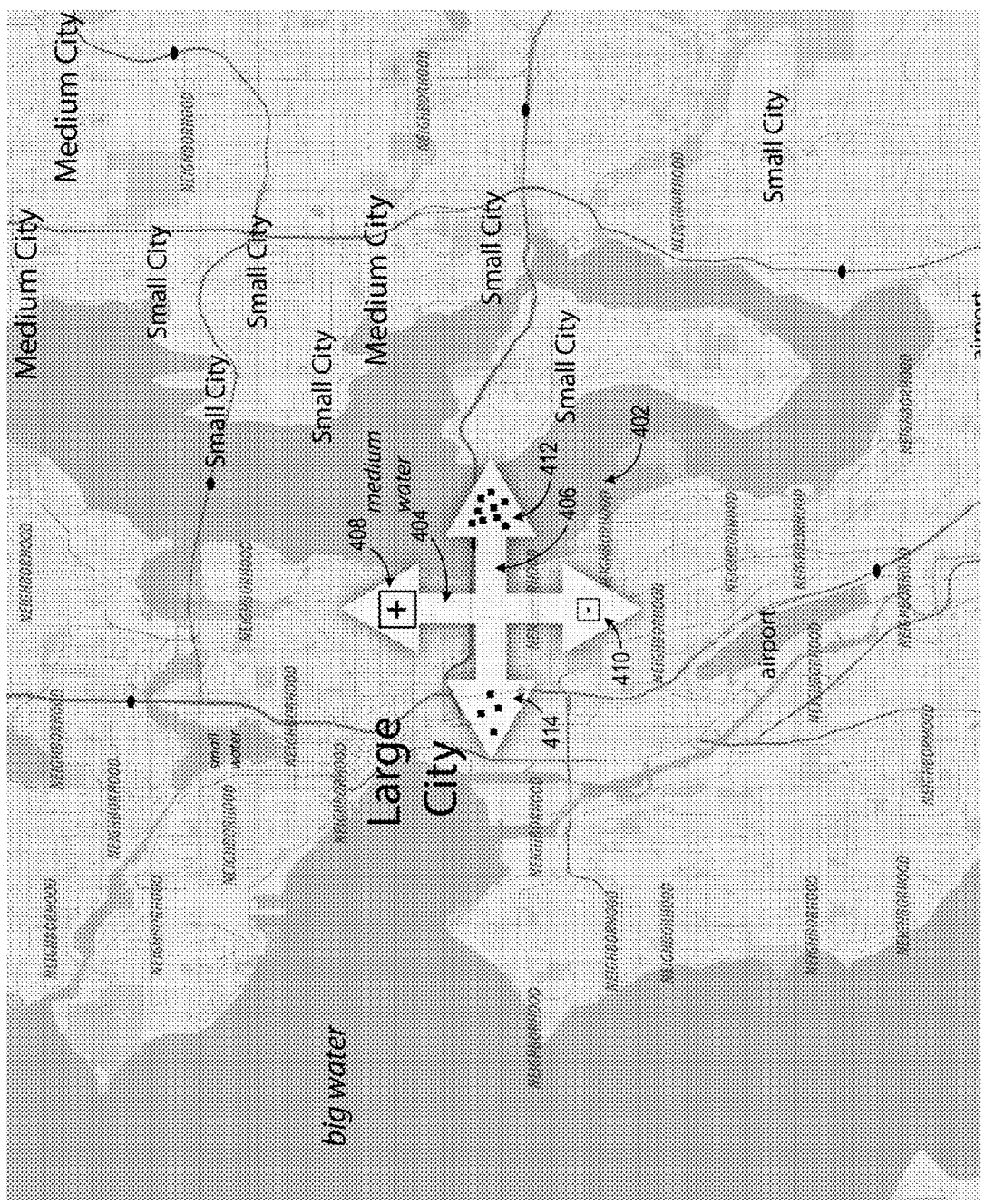
FIG. 4 is an example user interface, according to various embodiments.

Turning to FIG. 4, the user interface circuitry 110 may provide an interface to receive commands or instructions from a user to control aspects of the displayed map. In one embodiment, the user interface circuitry 110 may provide a graphical user interface (GUI) input 402 to enable a user to select different operations with respect to the map. For example, the GUI input 402 may be toggled on or off (e.g., by selection of a control button within the graphical user interface that presents the map, or by pressing and/or holding a key on a keyboard or a mouse). In one particular example, the GUI input 402 provides a first axis 404 and a second axis 406. A button or indicator 408 to increase the zoom level of the map (e.g., zoom into the map) and a button or indicator 410 to decrease the zoom level (e.g., zoom out of the map) may exist on the first axis 404. A button or indicator 412 to increase the level of detail of the map and a button or indicator 414 to decrease the level of detail of the map may exist on the second axis 406. A user may be able to toggle the GUI interface on or off, wherein directional movements of a pointer via mouse or a touchpad may dynamically change the display of the map according to the movement of the pointer (e.g., up and down to zoom in or zoom out, and left-to-right to decrease or increase the level of detail). Alternatively, the user may select buttons within the GUI input 402 to activate the corresponding command.

In another embodiment, the GUI input 402 may not actually be displayed on the display device; however, the user interface circuitry 110 may be responsive to movement of a pointer, a touchpad, a touchscreen, or another input device in the directions indicated by the GUI input 402. For example, a user may right click on a mouse and move a pointer in the associated directions to cause changes to the display of the map (e.g., up and down to change the zoom level, right and left to change the level of detail). Further still, the user interface circuitry 110 may be responsive to tilting, rotating, or moving the device, which may be interpreted as commands or instructions to alter the view of the map, particularly to change the level of detail displayed. Further still, the interface circuitry 110 may be responsive to voice commands, which may be interpreted as commands or instructions to alter the view of the map. In other approaches, the interface circuitry 110 may include a camera or light sensor and may be responsive to visual gestures (such as hand gestures, head gestures), facial expressions, or eye movement of a user.

In another embodiment, the user interface circuitry 110 receives gestures (e.g., via a touchscreen or a touchpad or by video monitoring of the user) to control the display of the map. For example, a first gesture may control the zoom of the map, while a second gesture may control the level of detail shown on the map. In one example, the first gesture (e.g., to control the zoom of the map) may include a two-finger pinch/spread gesture (one indicates a zoom in, while the other indicates a zoom out). The second gesture (e.g., to control the level of detail provided in the map) may be different from the first gesture and may include a three-finger pinch/spread gesture (one indicates an increase in the level of detail, while the other indicates a decrease in the level detail). Other gestures are possible to control the level of detail of the map, including a two-finger or three-finger rotation gesture or a two-finger or three-finger swipe gesture. Many variations for input gestures and input commands are possible.

Thus, in accordance with various embodiments, the machine 100 is configured to change a level of detail displayed in a map. The network interface circuitry 104 may receive, via the network 114, a map tile 116 corresponding to at least part of a visible area of the map to be displayed on the display device 108. The map tile 116 includes a first plurality of data items and a second plurality of data items. The memory device 106 stores the map tile 116. Alternatively, the machine 100 is coupled to a computer readable medium (e.g., an SD card, memory, or flash drive) that stores the map tiles.

The network interface circuitry 104 may also receive via the network 114 a stylesheet 118 including a first display schema for a first zoom level and a second display schema for the first zoom level. The first display schema defines the first plurality of data items and a first style associated with a first plurality of graphical representations of the first plurality of data items. Similarly, the second display schema defines a second plurality of data items and a second style associated with a second plurality of graphical representations of the second plurality of data items.

The rendering circuitry 102 renders a first graphical image of a map to include the first plurality of graphical representations of the first plurality of data items within a visible area of the map at a first zoom level. The rendering circuitry 102 may render the first graphical image of the map including the first plurality of graphical representations rendered in the first style. The display device 108 displays the first graphical image of the map at the first zoom level.

The user interface circuitry 110 is configured to receive a first instruction to change a level of detail of the map independent of control of a change to a current zoom level of the map. Alternatively, the first instruction may be to change a level of detail of the map within a current zoom level of the map. The first instruction may include an interaction with the machine 100 from a user including a gesture or interaction with an input device such as a mouse, touchpad, or a keyboard. The first instruction may be an instruction to increase or lower the level of detail of the map, for example, without changing the current level of zoom or independent of a change in the level of zoom. In response to receiving the first instruction by the user interface circuitry 110, the rendering circuitry 102 is further configured to render a second graphical image of the map to include a second plurality of graphical representations of a second plurality of data items within the visible area of the map at the first zoom level (e.g., without zooming into or zooming out of the map). In various embodiments, the second plurality of data items is of (or includes data items that are of) the same data category (e.g., parks, cities, roadways, etc.) as the first plurality of data items (or data items that are included in the first plurality of data items). The rendering circuitry 102 may render the second graphical image of the map including the second plurality of graphical representations rendered in the second style. The display device 108 is also configured to display the second graphical image of the map at the first zoom level.

In one approach, the second plurality of graphical representations of the second plurality of data items is greater in number than the first plurality of graphical representations of the first plurality of data items. The rendering circuitry 102 may increase the level of detail in the second graphical image of the map by including additional graphical representations of data items in the second graphical image of the map at the first zoom level not present in the first graphical image of the map at the first zoom level. Put another way, the rendering circuitry 102 may include additional graphical representations of data items while remaining in the first zoom level.

In various approaches, the map tile includes all necessary data items as may be called by the style sheet. For example, the map tile received by the machine 100 may include the data items as may be called by the most detailed view, even if the machine 100 is displaying the map at the lowest level of detail. Alternatively, multiple different map tiles may exist for each particular zoom level, perhaps corresponding to the different display schemas within the style sheet. Each of the different map tiles may include only the data items needed or called by a particular display schema for a given zoom level. As the machine 100 changes between different display schemas for a same zoom level, the machine 100 may request new map tiles or updates to its stored map tiles to accommodate the additional data. In accordance with this approach, only the data that is needed to display a map according to a particular display schema may be provided to the machine 100 as needed. This can reduce network traffic and data processing by the machine 100 by reducing the amount of unneeded data that might otherwise be transferred, particularly when viewing maps at a lower level of detail.

In another implementation, a data item is common to the first plurality of data items and the second plurality of data items at the first zoom level. The first style of the first display schema defines first graphical attributes for the common data item and the second style defines second graphical attributes of the common data item. The second graphical attributes are different than the first graphical attributes for the common data item. Graphical attributes may dictate the color, size, thickness, font, opacity, or other graphical attribute with which a data item can be displayed within the map. In this example, the rendering circuitry 102 renders the first graphical image of the map at the first zoom level including the common data item rendered in accordance with the first graphical attributes, and renders the second graphical image of the map at the first zoom level including the at least one common data item rendered in accordance with the second graphical attributes.

In another implementation, the user interface circuitry 110 receives a second instruction to change the current zoom level of the map to a second zoom level. The second instruction is different from the first instruction to change the level of detail of the map. The rendering circuitry 102 then renders a third graphical image of the map at the second zoom level in response to the user interface circuitry 110 receiving the second instruction, and the display device 108 displays the third graphical image of the map at the second zoom level.

In another implementation, the network interface circuitry 104 receives via a network 114 a stylesheet including a first display schema for the first zoom level defining the first plurality of data items and a second display schema for a second zoom level defining the second plurality of data items. The rendering circuitry 102 may render the second graphical image of the map at the first zoom level by using the second display schema for the second zoom level in the stylesheet while maintaining the visible area of the map at the first zoom level in response to the user interface circuitry receiving the first instruction to change the level of detail of the map. Put another way, in this embodiment, the rendering circuitry 102 utilizes display schemas from other zoom levels to change the level of detail shown in the map without switching to those other zoom levels.

Figure 5:
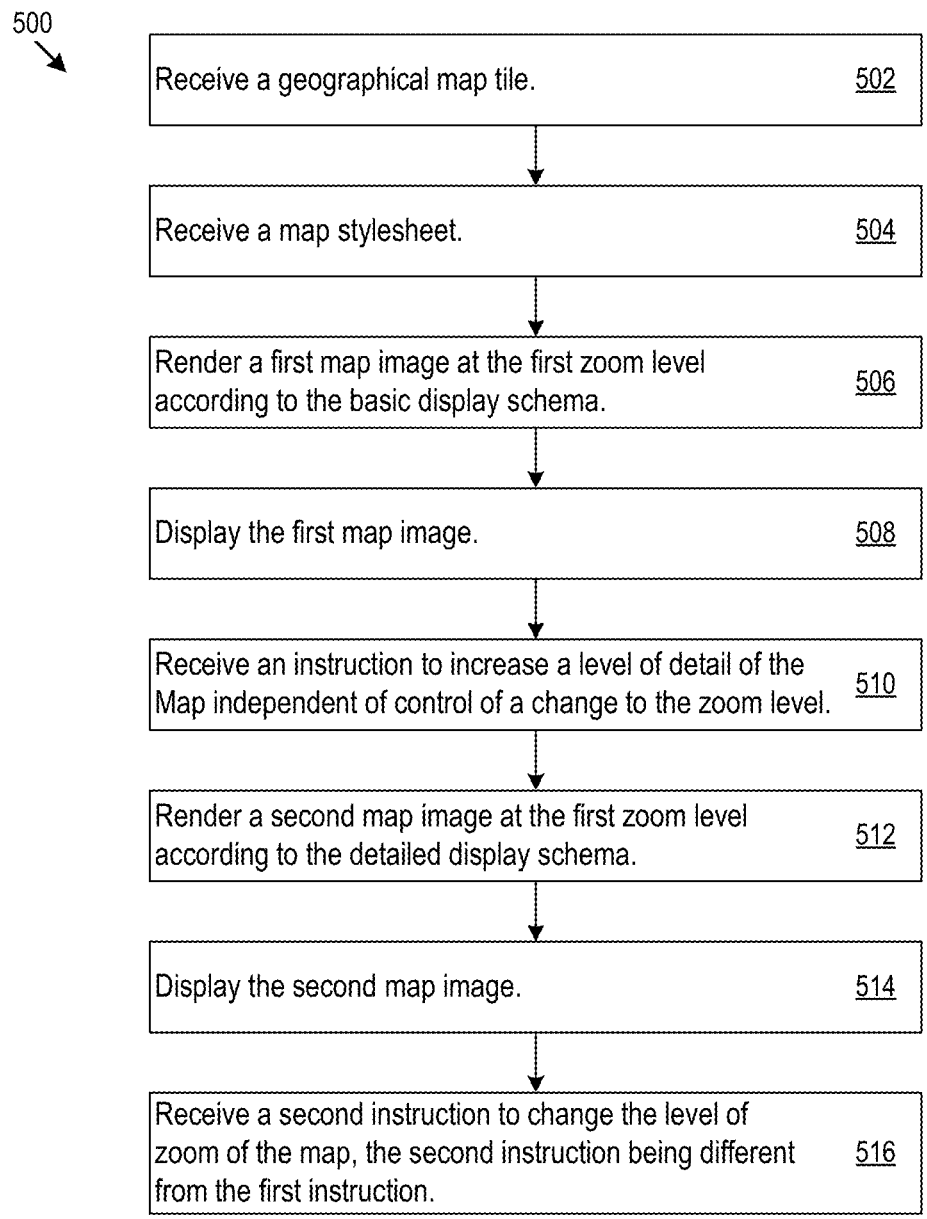
FIG. 5 is an example flow diagram of logic illustrating an example method of changing a level of detail displayed in a map, according to certain embodiments.

FIG. 5 shows a flow diagram of logic 500 that the machine 100 may implement as part of a method of increasing a level of detail displayed in a map. For instance, various circuitry elements discussed above and/or various components of the computing device 800 shown in FIG. 8 (such as the processing device 802) may be configured to implement some or all of the logic 500 shown in FIG. 5. At step 502, the computing device 800 receives a geographical map tile 116 via a network 114. The geographical map tile 116 includes a plurality of data items corresponding to a plurality of geographical elements within a geographical area defined by the geographical map tile (e.g., within the borders of the geographical map tile). The geographical elements may be physical natural elements (e.g., forests, lakes, and/or mountains), physical man-made elements (e.g., roads, cities, and/or structures), or labels or other data relating to those physical elements within the geographical map tile or the entirety of the geographical map tile.

At step 504, the computing device 800 receives a map stylesheet 118 via the network 114. The map stylesheet 118 includes at least a basic display schema for a first zoom level and a detailed display schema for the same first zoom level. The detailed display schema includes or provides instructions to the computing device 800 to render a map with more data items of the plurality of data items of the geographical map tile as compared to the basic display schema. Thus, the detailed display schema provides a view of the map having more detail than the basic display schema by including more data items for display on the map than the basic display schema.

At step 506, the processing device 802 of the computing device 800 (which may implement portions of the rendering circuitry 102) renders a first map image corresponding to the geographical map tile at the first zoom level and in accordance with the basic display schema for the first zoom level. In one approach, the processing device 802 and/or the rendering circuitry 102 renders or generates the first map image by generating images of lines, shapes, colors, text, and other graphical elements or graphical representations of data items within the geographical map tile. The processing device 802 and/or the rendering circuitry 102 generates these graphical elements by using the vector data and other data within the map tile for the location, shape, and content of the graphical elements, and using the styles indicated in the basic schema for the various classifications of data items within the map tile. At step 508, the display device 108 of the computing device 800 may display the first map image at the first zoom level.

At step 510, the computing device 800 receives via the user interface circuitry 110, an instruction from a user to increase a level of detail of the first map image displayed on the display device 108 independent of control of a change to a present zoom level of the first map image. For example, as discussed herein, the user interface circuitry 110 may receive interactions (such as gestures) that represent commands to increase or decrease the level of detail displayed in the map, which command is independent of or different from a command to change the zoom level at which the map is displayed.

In response to receiving the instruction to increase the level of detail of the first map image at step 510, the processing device 802 and/or the rendering circuitry 102, at step 512, renders a second map image corresponding to the geographical map tile at the first zoom level and in accordance with the detailed display schema for the first zoom level. In various implementations, the processing device 802 and/or the rendering circuitry 102 renders the second map image to include additional graphical representations of data items not present in the first map image, thereby increasing the level of detail of the displayed map. At step 514, the display device 108 of the computing device 800 may display the second map image at the first zoom level.

In some embodiments, the basic display schema and the detailed display schema may indicate that a common data item within the two display schemas should be displayed with different styles. The basic display schema of the first zoom level may include instructions to the computing device 800 to render the common data item of the geographical map tile with a first style. Similarly, the detailed display schema of the first zoom level includes instructions to the computing device 800 to render the common data item of the geographical map tile with a second style, the second style being different than the first style. Put another way, the basic display schema and the detailed display schema may assign different styles to a same data item. For example, in the basic display schema, a road may be displayed with a light color and with a thin line, while in the detailed display schema that same road may be displayed with a darker color and a thicker line. Many variations are possible.

Using these different display schemes, the processing device 802 and/or the rendering circuitry 102 may render (e.g., at step 506) the first map image to include the common data item rendered in the first style. Similarly, the processing device 802 and/or the rendering circuitry 102 may render (e.g., at step 512) the second map image to include the common data item rendered in the second style in response to receiving the instruction to increase the level of detail of the first map image (e.g., at step 510).

In some implementations, at step 516, the user interface circuitry 110 may receive a second instruction from a user (e.g., a gesture) to change a zoom level of the first map image displayed on the display device 108. The second instruction to change the zoom level may be different from the instruction to increase the level of detail of the first map image. Thus, in accordance with various embodiments, the user interface circuitry 110 enables receipt of different commands or gestures, independent from each other, to separately control the level of detail of the map and the zoom level. In response to receiving the second command or gesture, the processing device may render a third graphical image of the map at the second zoom level and display, on the display device 108, the third graphical image of the map at the second zoom level.

In another embodiment, the machine 100 may change between zoom levels while maintaining a same detail level setting offset for each zoom level. For example, if a map is displayed at zoom level 12 using display schema 12.4 and the machine 100 receives a command to increase the zoom level, the machine 100 may maintain the x.4 display schema for the subsequent zoom levels. For example, if a 12.3 display schema is the default display schema (and therefore default level of detail) for zoom level 12, the 12.4 display schema represents a non-default detail view having a +1 detail level setting offset. When transitioning to other zoom levels, the machine 100 may maintain the same non-default detail view with the +1 detail level setting offset for those other zoom levels. Thus, if a transition to zoom level 14 is initiated, the machine 100 may utilize a 14.4 display schema having the same non-default detail view with the +1 detail level setting offset. Accordingly, in certain implementations, if the second graphical image of the map comprises a non-default detail view for the first zoom level (e.g., according to the second display schema having a detail level setting offset), and if the computing device 800 receives a command to change the zoom level of the map, the processing device 802 renders a third graphical image of the map at a second zoom level with a non-default detail view for the second zoom level (e.g., with the same detail level setting offset).

Figure 6:
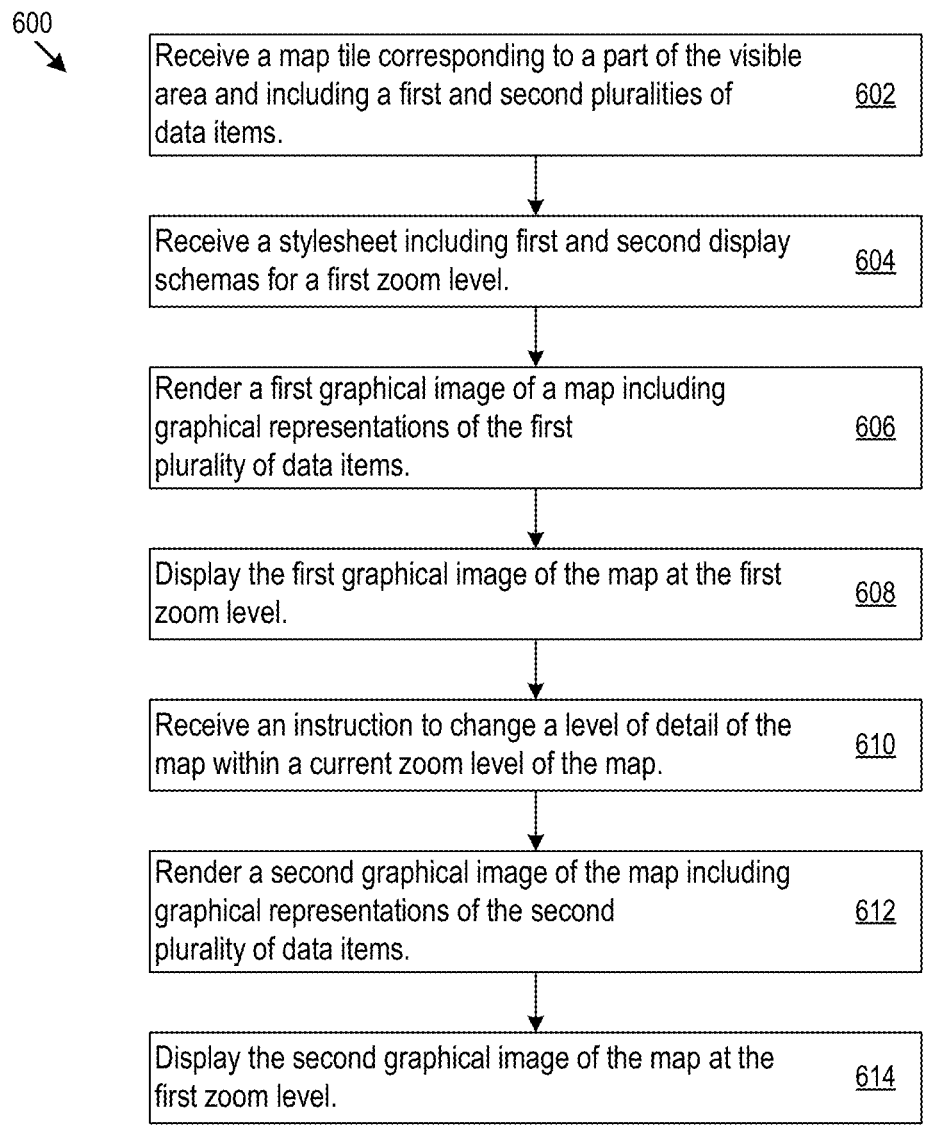
FIG. 6 is another example flow diagram of logic illustrating an example method of changing a level of detail displayed in a map, according to certain embodiments.

FIG. 6 shows another flow diagram of logic 600 that the machine 100 may implement as part of a method in accordance with various embodiments. For instance, various circuitry elements discussed above and/or various components of the computing device 800 shown in FIG. 8 (such as the processing device 802) may be configured to implement some or all of the logic 600 shown in FIG. 6. At step 602, the computing device 800 receives, via a network 114, a map tile corresponding to at least part of the visible area of the map. In this embodiment, the map tile includes a first plurality of data items and a second plurality of data items.

At step 604, the computing device 800 receives, via a network 114, a stylesheet including a first display schema for the first zoom level and a second display schema for the first zoom level. The first display schema defines the first plurality of data items and a first style associated with a first plurality of graphical representations of the first plurality of data items. Further, the second display schema defines the second plurality of data items and a second style associated with the second plurality of graphical representations of the second plurality of data items. In certain approaches, the second plurality of graphical representations of the second plurality of data items is greater in number than the first plurality of graphical representations of the first plurality of data items. In various embodiments, the second plurality of data items is of the same data category (e.g., parks, cities, roadways, etc.) as the first plurality of data items. Alternatively, the second plurality of data items includes data items that are of the same data category as data items that are included in the first plurality of data items.

At step 606, the processing device 802 of the computing device 800 renders a first graphical image of a map including the first plurality of graphical representations of the first plurality of data items within a visible area of the map at a first zoom level. This may include rendering the first plurality of graphical representations in the first style according to the first display schema. At step 608, the display device 108 displays the first graphical image of the map at the first zoom level. At step 610, the user interface circuitry 110 receives a first instruction to change a level of detail of the map within a current zoom level of the map. This first instruction may include an instruction to increase or decrease the level of detail of the map within the current zoom level of the map or independent of a separate command to change the zoom level.

In response to receiving the first instruction (step 610), at step 612, the processing device 802 renders a second graphical image of the map including a second plurality of graphical representations of a second plurality of data items within the visible area of the map at the first zoom level. This may include rendering the second plurality of graphical representations in the second style according to the second display schema. In some embodiments, this may also include increasing the level of detail of the map in the second graphical image of the map by including additional graphical representations of data items in the second graphical image of the map at the first zoom level not present in the first graphical image of the map at the first zoom level. At step 614, the display device 108 displays the second graphical image of the map at the first zoom level.

FIG. 7 shows another flow diagram of logic 700 that the machine 100 may implement as part of an alternative method in accordance with various embodiments. For instance, various circuitry elements discussed above and/or various components of the computing device 800 shown in FIG. 8 (such as the processing device 802) may be configured to implement some or all of the logic 700 shown in FIG. 7.

At step 702, the computing device 800 receives, via a network 114, a stylesheet including first display schema for the first zoom level defining the first plurality of data items and a second display schema for a second zoom level defining the second plurality of data items. Thus, in this embodiment, the stylesheet provides the second display schema in association with a second, different zoom level from the first zoom level. At step 704, the processing device 802 may render the second graphical image of the map at the first zoom level by using the second display schema for the second zoom level in the stylesheet while maintaining the visible area of the map at the first zoom level in response to receiving the first instruction to change the level of detail of the map.

This alternative embodiment is unlike the previous embodiments discussed above in that it deals with instances where an individual zoom level might not include multiple display schemas within the stylesheet. However, this alternative embodiment may be used in conjunction with the embodiments discussed above, for example, in an instance where a stylesheet includes multiple display schemas only for some of the individual zoom levels. Thus, the computing device 800 may utilize this alternative embodiment for changing the level of detail shown at certain zoom levels that do not include multiple display schemas.

Figure 8:
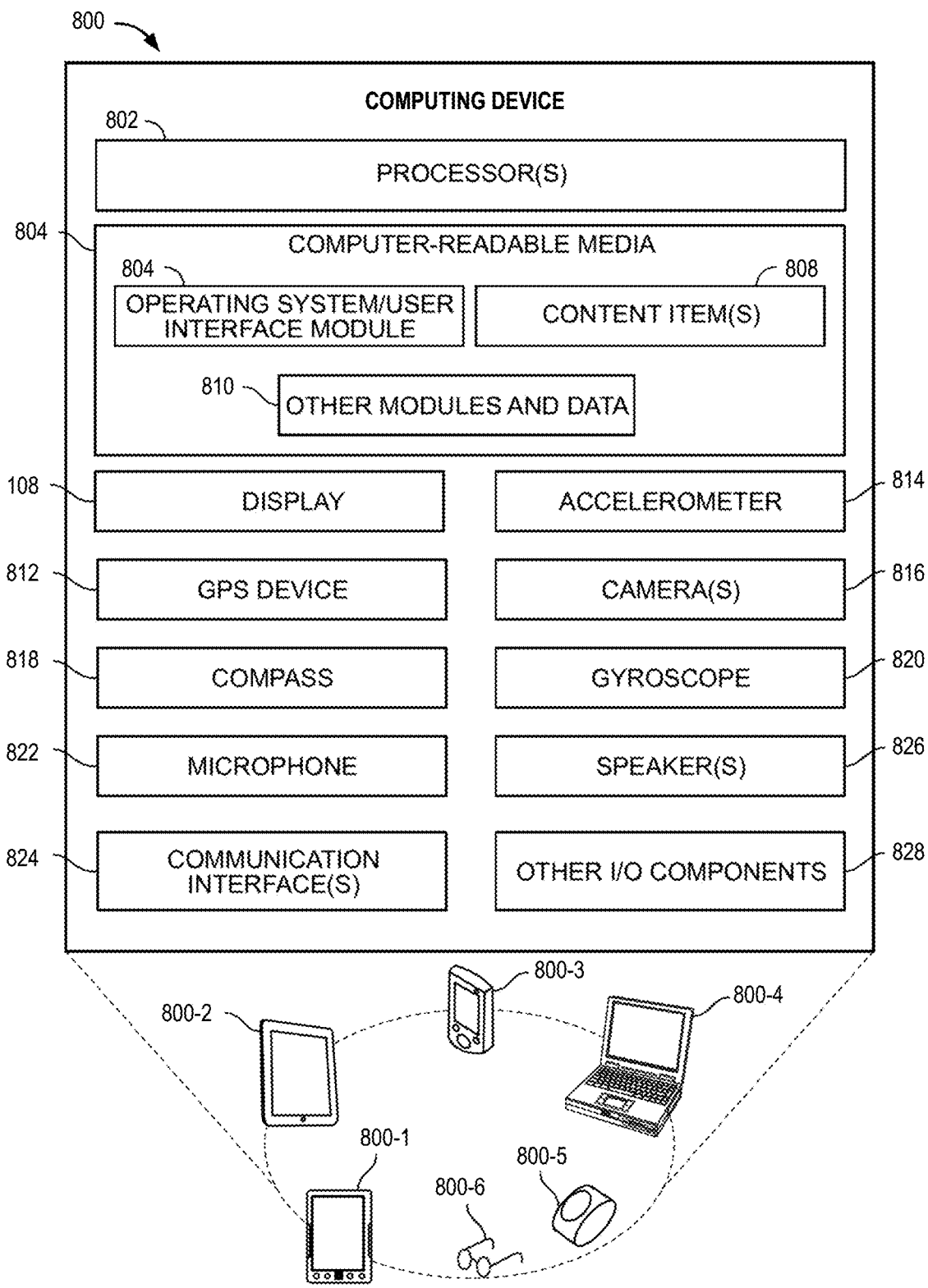
FIG. 8 illustrates select components of an example computing device, according to various embodiments.

FIG. 8 illustrates select example components of an example computing device 800 according to some implementations. Computing device 800 may be implemented as any of a number of different types of electronic devices. Some examples may include digital media devices and eBook readers 800-1; tablet computing devices 800-2; smart phones, mobile devices and portable gaming systems 800-3; laptop and netbook computing devices 800-4; wearable computing devices 800-5; augmented reality devices, helmets, goggles or glasses 800-6; and any other device including a processor 802 and memory (e.g., computer-readable media 804) for controlling the display of a map according to the techniques described herein.

In various configurations, computing device 800 includes, or accesses, components such as at least one control logic circuit, central processing unit, or processing device ("processor") 802, and one or more computer-readable media 804 (e.g., memory). Each processor 802 may itself comprise one or more processors or processing cores. For example, processor 802 can be implemented as one or more microprocessors, microcomputers, microcontrollers, digital signal processors, central processing units, state machines, logic circuitries, and/or any devices that manipulate signals based on operational instructions. In some cases, processor 802 may be one or more hardware processors and/or logic circuits of any suitable type specifically programmed or configured to execute the algorithms and processes described herein. Processor 802 can be configured to fetch and execute computer-readable instructions stored in computer-readable media 804 or other computer-readable media. Processor 802 can perform one or more of the functions attributed to the machine 100, and in particular attributed to the rendering circuitry 102, the network interface circuitry 104, and/or the user interface circuitry 110.

Depending on the configuration of the computing device 800, computer-readable media 804 may be an example of tangible non-transitory computer storage media and may include volatile and nonvolatile memory and/or removable and non-removable media implemented in any type of technology for storage of information such as computer-readable instructions, data structures, program modules or other data. Computer-readable media 804 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, computing device 800 may access external storage, such as RAID storage systems, storage arrays, network attached storage, storage area networks, cloud storage, or any other medium that can be used to store information and that can be accessed by processor 802 directly or through another computing device or network. Accordingly, computer-readable media 804 may be computer storage media able to store instructions, modules or components that may be executed by processor 802.

Computer-readable media 804 may be used to store and maintain any number of functional components that are executable by processor 802. In some implementations, these functional components comprise instructions or programs that are executable by processor 802 and that, when executed, implement operational logic for performing the actions attributed above to computing device 800. Functional components of computing device 800 stored in computer-readable media 804 may include the operating system and user interface module 806 for controlling and managing various functions of computing device 800, and for generating one or more user interfaces on display device 108 of computing device 800.

In addition, computer-readable media 804 may also store data, data structures and the like, that are used by the functional components. For example, data stored by computer-readable media 804 may include user information and, optionally, one or more content items 808. Depending on the type of computing device 800, computer-readable media 804 may also optionally include other functional components and data, such as other modules and data 810, which may include programs, drivers and so forth, and the data used by the functional components. Further, computing device 800 may include many other logical, programmatic and physical components, of which those described are merely examples that are related to the discussion herein. Further, while the figures illustrate the functional components and data of computing device 800 as being present on computing device 800 and executed by processor 802 on computing device 800, it is to be appreciated that these components and/or data may be distributed across different computing devices and locations in any manner.

FIG. 8 further illustrates examples of other components that may be included in computing device 800. Such examples include various types of sensors, which may include, for example, the display device 108, a GPS device 812, an accelerometer 814, one or more cameras 816, a compass 818, a gyroscope 820, and/or a microphone 822. Display device 108 may be an LCD display, a cholesteric display, an electrophoretic display, an electrofluidic pixel display, a photonic ink display, or an electrowetting display panel.

Computing device 800 may further include one or more communication interfaces 824, which may comprise all or portions of the structure and functionality of the network interface circuitry 104. The communication interfaces 824 may support both wired and wireless connection to various networks, such as cellular networks, radio, Wi-Fi networks, close-range wireless connections, near-field connections, infrared signals, local area networks, wide area networks, and/or the Internet, for example. Communication interfaces 824 may further allow a user to access storage on or through another device, such as a remote computing device, a network attached storage device, or cloud storage. Additionally, the communication interfaces 824 may include system busses to effect intercommunication between various elements, components, and circuitry portions of the computing device 800. Example system bus implementations include Peripheral Component Interconnect Express (PCIe), Serial or Parallel Advanced Technology Attachment (SATA or PATA), and integrated drive electronics (IDE) based buses.

Computing device 800 may further be equipped with one or more speakers 826 and various other input/output (I/O) components 828. The I/O components 828 may form portions of the user interface circuitry 110. Such I/O components 828 may include, for example, a touchscreen and various user controls (e.g., buttons, a joystick, a keyboard, and/or a keypad), a haptic or tactile output device, connection ports, and/or physical condition sensors. For example, operating system 806 of computing device 800 may include suitable drivers configured to accept input from a keypad, keyboard, or other user controls and devices included as I/O components 828. Additionally, computing device 800 may include various other components that are not shown, examples of which include removable storage, a power source, such as a battery and power control unit, and/or a PC Card component.

Many of the embodiments are described herein with an application to increase or reduce the level of detail shown within a digital map. However, the concepts and embodiments can be extended to altering the display of digital data along trajectories other than the level of detail or the zoom level for a map (or for any display of digital data). For example, the embodiments herein can be applicable to altering other aspects of the image such as, for example, a color of the map, the number of restaurants shown on a map, the details of the level of traffic currently on roadways or weather in the area, or any other aspect that may be pertinent to a geographical area. Additionally, the machine 100 may enable a user to rotate between different views of a map that each provide an image of the map with increased detail for a particular type of data item (e.g., only increasing detail with respect to roads, bodies of water, city names, or national parks for each different version of the map). In another example, the machine 100 may enable a user to alter text size and/or text opacity independent of a change to the zoom level. In another example, the machine 100 may enable a user to select particular aspects that the user would like to increase detail for dynamically (e.g., with a checkbox or selector) such that only the detail for the selected data item is altered independent of a change to the zoom level. In another example, the user interface circuitry 110 may enable a user to enter a search relating to the digital map (e.g., "restaurants") such that the machine 100 may enable the user to only alter the level of detail with respect to items relating to the search (e.g., the number of restaurants shown) independent of a change to the zoom level. In this example, the machine 100 may select to only increase the level of detail or number of restaurants shown on a map in response to a user inputting a command to change the level of detail of the map independent of a change to the zoom level.

Moreover, although many of the embodiments are described herein within the particular context of digital maps, the concepts and embodiments are extendable to and applicable to other contexts involving the display of digital data and are not limited to digital maps. For example, the embodiments may be equally applicable to the display and interaction with a rendering of a body (e.g., for anatomy purposes) to independently control the zoom level and the level of detail for the shown area of the body. Similarly, the concepts are applicable to the control of a display of virtual reality or augmented reality digital data and imagery to provide independent control of different data aspects. Additionally, the concepts are applicable to the control of a display of digital data associated with architectural, manufacturing, or engineering drawings or models, schematics, block diagrams, data structures, graphical design images, or other visual data independent of another display aspect, such as zoom level. For example, with an engineering models or a graphical design image, a user can turn on or off layers or increase or decrease the level of detail shown within a layer or within the image overall using a simple command or gesture independent of another command or gesture that controls the level of zoom of the model or image. Other variations are possible.

Various instructions, methods and techniques described herein may be considered in the general context of computer-executable instructions, such as program modules stored on computer storage media and executed by the processors herein. Generally, program modules include, for example, routines, programs, objects, components, and/or data structures, for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in one or more non-transitory computer-readable mediums that may include a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings. The computer-readable medium may include instructions that, when executed by circuitry elements, cause the circuitry elements to perform a method including one or more steps discussed in this disclosure.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. One skilled in the art will realize that a virtually unlimited number of variations to the above descriptions are possible, and that the examples and the accompanying figures are merely to illustrate one or more examples of implementations. It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

Various implementations have been specifically described. However, many other implementations are also possible.

What is claimed is:

1. A computer-implemented method to enable independence of zoom and density controls for displaying a map, the computer-implemented method comprising:

receiving, at a computing device via a network, (i) a geographical map tile comprising a plurality of data items corresponding to a plurality of geographical elements within a geographical area defined by the geographical map tile and (ii) a map stylesheet comprising a respective display schema for each of at least three levels of density of detail in terms of geographical imagery of the geographical area, the at least three levels of density including a first level of density and a second level of density;

rendering, by a processing device of the computing device, a first map image corresponding to the geographical map tile at a first zoom level and in accordance with the display schema for the first level of density, wherein the first map image is output;

responsive to receiving, via a user interface, an instruction to increase a level of density of the first map image independently of a present zoom level of the first map image, rendering a second map image corresponding to the geographical map tile at the first zoom level and in accordance with the display schema for the second level of density, wherein the second map image is output; and responsive to receiving, via the user interface, an instruction to change the present zoom level of the second map image independently of the level of density of the second map image, rendering a third map image corresponding to the geographical map tile at a second zoom level and in accordance with the display schema for the second level of density, wherein the third map image is output, wherein the first, second, and third map images each occupies a region of substantially similar size on a display device of the computing device.

2. The computer-implemented method of claim 1, wherein:
the display schema for the first level of density includes instructions to the computing device to render a common data item of the geographical map tile with a first style, and
the display schema for the second level of density includes instructions to the computing device to render the common data item of the geographical map tile with a second style, the second style being different than the first style,
the computer-implemented method further comprising:
rendering the first map image corresponding to the geographical map tile at the first zoom level including the common data item rendered in the first style; and
rendering the second map image corresponding to the geographical map tile at the first zoom level including the common data item rendered in the second style in response to receiving the instruction to increase the level of density of the first map image.

3. The computer-implemented method of claim 1, wherein each data item has a respective type, wherein the computer-implemented method further comprises:
responsive to an instruction to change a level of detail of a specified type of data item, changing the level of detail of the specified type of data item independently of a change to a level of detail of other types of data items.

4. A computer-implemented method to enable independence of zoom and density controls for displaying a map, the computer-implemented comprising:
rendering, with a processing device of a computing device, a first graphical image of the map, the first graphical image including a first plurality of graphical representations of a first plurality of data items within a visible area of the map at a first zoom level and at a first level of density selected from at least three levels of density of detail in terms of geographical imagery of the visible area of the map, wherein the first graphical image of the map is output;
responsive to receiving, via a user interface, a first instruction to change a level of density of the map independent of the first zoom level of the map, rendering a second graphical image of the map, the second graphical image including a second plurality of graphical representations of a second plurality of data items within the visible area of the map at the first zoom level and at a second level of density selected from the at least three levels of density, the second plurality of data items being of a same data category as the first plurality of data items, wherein the second graphical image of the map is output; and
responsive to receiving, via the user interface, a second instruction to change the first zoom level of the map independently of the second level of density of the map, rendering a third graphical image of the map, the third graphical image including the second plurality of graphical representations at a second zoom level of the map, wherein the third graphical image is output, wherein the first, second, and third graphical images each occupies a region of substantially similar size on a display device of the computing device.

5. The computer-implemented method of claim 4, further comprising:
receiving, at the computing device via a network, a map tile corresponding to at least part of the visible area of the map, the map tile including the first plurality of data items and the second plurality of data items.

6. The computer-implemented method of claim 4, further comprising:
receiving a stylesheet including a first display schema for the first level of density and further including a second display schema for the second level of density, wherein the first display schema defines the first plurality of data items and a first style associated with the first plurality of graphical representations and wherein the second display schema defines the second plurality of data items and a second style associated with the second plurality of graphical representations; and
wherein rendering the first graphical image of the map comprises rendering the first plurality of graphical representations in the first style and wherein rendering the second graphical image of the map comprises rendering the second plurality of graphical representations in the second style.

7. The computer-implemented method of claim 4, wherein the first instruction further comprises an instruction to increase the level of density of the map independent of the first zoom level of the map, and
wherein the second plurality of graphical representations of the second plurality of data items is greater in number than the first plurality of graphical representations of the first plurality of data items,
the computer-implemented method further comprising increasing the level of density of the map in the second graphical image of the map by including additional graphical representations of data items in the second graphical image of the map at the first zoom level not present in the first graphical image of the map at the first zoom level.

8. The computer-implemented method of claim 4, further comprising:
receiving, at the computing device via a network, a stylesheet including a first display schema for the first zoom level defining the first plurality of data items and a second display schema for a second zoom level defining the second plurality of data items; and
rendering the second graphical image of the map at the first zoom level by using the second display schema for the second zoom level in the stylesheet while maintaining the visible area of the map at the first zoom level in response to receiving the first instruction to change the level of density of the map.

9. The computer-implemented method of claim 4, wherein the first and second instructions comprise different gestures.

10. The computer-implemented method of claim 4, wherein each data item has a respective type, wherein the computer-implemented method further comprises:
responsive to a third instruction to change a level of detail of a specified type of data item, changing the level of detail of the specified type of data item independently of a change to a level of detail of other types of data items;
receiving, at the computing device via a network, a map tile corresponding to at least part of the visible area of the map, the map tile including the first plurality of data items and the second plurality of data items; and receiving a stylesheet comprising a plurality of schemas including a respective display schema for each of the at least three levels of density, the plurality of schemas including a first display schema for the first level of density and further including a second display schema for the second level of density;

wherein each of the first and second graphical images of the map is rendered in accordance with the display schema for the respective level of density selected from the first and second levels of density.

11. The computer-implemented method of claim 10, wherein the first display schema defines (i) the first plurality of data items and (ii) a first style associated with the first plurality of graphical representations, wherein the second display schema defines (i) the second plurality of data items and (ii) a second style associated with the second plurality of graphical representations; and wherein rendering the first graphical image of the map comprises rendering the first plurality of graphical representations in the first style, wherein rendering the second graphical image of the map comprises rendering the second plurality of graphical representations in the second style.

12. The computer-implemented method of claim 11, wherein the first style defines first graphical attributes for a common data item and the second style defines second graphical attributes for the common data item, the second graphical attributes being different than the first graphical attributes, the common data item being common to the first plurality of data items and the second plurality of data items at the first zoom level, wherein the computer-implemented method further comprises:

rendering the first graphical image of the map at the first zoom level including the common data item rendered in accordance with the first graphical attributes; and rendering the second graphical image of the map at the first zoom level including the common data item rendered in accordance with the second graphical attributes.

13. The computer-implemented method of claim 12, wherein the first instruction comprises a first gesture, wherein the second instruction comprises a second gesture different from the first gesture, wherein the second graphical image of the map comprises a non-default detail view for the first zoom level, wherein the computer-implemented method further comprises:

rendering the third graphical image of the map at the second zoom level with a non-default detail view for the second zoom level; and displaying the third graphical image of the map at the second zoom level.

14. The computer-implemented method of claim 13, wherein the first instruction further comprises an instruction to increase the level of density of the map independent of the first zoom level of the map;

wherein the second plurality of graphical representations of the second plurality of data items is greater in number than the first plurality of graphical representations of the first plurality of data items, wherein the computer-implemented method further comprises:

increasing the level of density of the map in the second graphical image of the map by including additional graphical representations of data items in the second graphical image of the map at the first zoom level not present in the first graphical image of the map at the first zoom level.

15. The computer-implemented method of claim 4, wherein each data item has a respective type, wherein the computer-implemented method further comprises:

responsive to a third instruction to change a level of detail of a specified type of data item, changing a level of detail of the specified type of data item independently of a change to a level of detail of other types of data items.

16. A machine to enable independence of zoom and density controls for displaying a map, the machine comprising:

rendering circuitry configured to render a first graphical image of a map to include a first plurality of graphical representations of a first plurality of data items within a visible area of the map at a first zoom level and at a first level of density selected from at least three levels of density of detail in terms of geographical imagery of the visible area of the map;

a display device configured to display the first graphical image; and user interface circuitry configured to receive a first instruction to change a level of density of the map independently of the first zoom level of the map;

wherein the rendering circuitry is further configured to, responsive to receiving the first instruction, render a second graphical image of the map to include a second plurality of graphical representations of a second plurality of data items within the visible area of the map at the first zoom level and at a second level of density selected from the at least three levels of density, the second plurality of data items being a same data category as the first plurality of data items;

wherein the display device is further configured to display the second graphical image;

wherein the user interface circuitry is further configured to receive a second instruction to change a zoom level of the map independently of the second level of density;

wherein the rendering circuitry is further configured to, responsive to receiving the second instruction, render a third graphical image of the map to include the second plurality of graphical representations at a second zoom level and at the second level of density;

wherein the display device is further configured to display the third graphical image, wherein the first, second, and third graphical images each occupies a region of substantially similar size on the display device.

17. The machine of claim 16, further comprising:

network interface circuitry configured to receive, via a network, (i) a stylesheet including a first display schema for the first zoom level and (ii) a second display schema for the first zoom level, wherein the first display schema defines the first plurality of data items and a first style associated with the first plurality of graphical representations and wherein the second display schema defines the second plurality of data items and a second style associated with the second plurality of graphical representations; and wherein the rendering circuitry is further configured to render the first graphical image of the map including the first plurality of graphical representations rendered in the first style and render the second graphical image of the map including the second plurality of graphical representations rendered in the second style.

18. The machine of claim 16, wherein the first instruction further comprises an instruction to increase the level of density of the map independent of the first zoom level of the map,
- wherein the second plurality of graphical representations of the second plurality of data items is greater in number than the first plurality of graphical representations of the first plurality of data items, and
- wherein the rendering circuitry is further configured to increase the level of density in the second graphical image of the map by including additional graphical representations of data items in the second graphical image of the map at the first zoom level not present in the first graphical image of the map at the first zoom level.

19. The machine of claim 16, further comprising:
network interface circuitry configured to receive via a network a stylesheet including a first display schema for the first zoom level defining the first plurality of data items and a second display schema for a second zoom level defining the second plurality of data items; and
wherein the rendering circuitry is further configured to render the second graphical image of the map at the first zoom level by using the second display schema for the second zoom level in the stylesheet while maintaining the visible area of the map at the first zoom level in response to the user interface circuitry receiving the first instruction to change the level of density of the map.

20. The machine of claim 16, wherein each data item has a respective type, wherein the rendering circuitry is further configured to:
responsive to a third instruction to change a level of detail of a specified type of data item, change a level of detail of the specified type of data item independently of a change to a level of detail of other types of data items.

* * * * *

UNITED STATES PATENT AND TRADEMARK OFFICE
CERTIFICATE OF CORRECTION

PATENT NO. : 10,534,523 B1
APPLICATION NO. : 15/366802
DATED : January 14, 2020
INVENTOR(S) : Bruce Daniel et al.

Page 1 of 1

It is certified that error appears in the above-identified patent and that said Letters Patent is hereby corrected as shown below:

In the Claims

In Column 23, Line 50, in Claim 4, delete "independent" and insert -- independently --, therefor.

In Column 25, Line 58, in Claim 14, delete "independent" and insert -- independently --, therefor.

Signed and Sealed this
Second Day of June, 2020

Andrei Iancu
*Director of the United States Patent and Trademark Office*